(12) United States Patent
Hobbs et al.

(10) Patent No.: US 7,732,975 B1
(45) Date of Patent: Jun. 8, 2010

(54) BIASED GAP-CLOSING ACTUATOR

(75) Inventors: Eric D. Hobbs, Livermore, CA (US);
Gaetan L. Mathieu, Vareness (CA)

(73) Assignee: FormFactor, Inc., Livermore, CA (US)

(*) Notice: Subject to any disclaimer, the term of this patent is extended or adjusted under 35 U.S.C. 154(b) by 0 days.

(21) Appl. No.: 12/345,292

(22) Filed: Dec. 29, 2008

(51) Int. Cl.
*H02N 1/00* (2006.01)
(52) U.S. Cl. .................................................. 310/309
(58) Field of Classification Search ................ 310/309;
73/780; 324/457
See application file for complete search history.

(56) References Cited

U.S. PATENT DOCUMENTS 6,140,737 A * 10/2000 Boie .......................... 310/309
7,242,129 B2 * 7/2007 Kim et al. ................... 310/309

* cited by examiner

*Primary Examiner*—Thomas M Dougherty
(74) *Attorney, Agent, or Firm*—N. Kenneth Burraston

(57) ABSTRACT

A gap-closing actuator includes a stator having one or more first electrodes, a mover having one or more second electrodes interposed among the first electrodes, and a biasing mechanism for applying a non-capacitive bias to the mover for urging the mover to move in a desired direction with respect to the stator. The non-capacitive bias is different from a capacitive force generated between the first and second electrodes when the gap-closing actuator is in operation.

15 Claims, 7 Drawing Sheets

BIASED GAP-CLOSING ACTUATOR

BACKGROUND

An electric actuator is a device that is capable of converting electrical energy into mechanical energy, for example in form of linear or rotational motions, to drive other devices. The electric actuator can be designed and fabricated in a miniature size on a semiconductor substrate by micromachining and/or semiconductor processing technology. Such electric actuator is a type of micro-electro-mechanical system (MEMS) that can augment microelectronics, such as a system on a chip (SOC), by generating motions in order to control its environment in response to signals received from the microelectronics.

FIG. 1 illustrates a schematic top view of a typical MEMS actuator 10 comprising a stator 12, a mover 14 capable of moving relative to the stator 12, and a number of return springs 20, 22, and 24. The stator 12 can have a plurality of first electrodes 16 extending therefrom toward the mover 14. The mover 14 can have a plurality of second electrode 18 extending therefrom toward the stator 12. At least one of the first electrodes 16 can be disposed between two consecutive second electrodes 18 in a manner where the first electrode 16 is closer to one of the second electrodes 18 than the other. Likewise, at least one of the second electrodes 18 can be disposed between two consecutive first electrodes 16 in a manner where the second electrode 18 is closer to one of the first electrodes 16 than the other. The mover 14 can have one or more protrusions 19 extending from one or more sides of its body, respectively. The return springs 20 and 22 can be coupled between the mover 14 and their respective fixtures 26 and 28. Each of the return springs 24 can have one end coupled to a fixture 30, and another end disposed in proximity of its corresponding protrusion 19.

In operation, the first and second electrodes 16 and 18 can be electrically charged to create a capacitive force between them. As discussed above, because the first and second electrodes 16 and 18 are interposed in an asymmetric manner, the capacitive force generated can move the mover 14 in a desired direction relative to the stator 12 as shown by an arrow 13 in the figure. As the mover 14 moves away from its initial position, the return springs 20, 22, and 24 may deflect to provide it with a return force that is necessary to push the mover 14 back to its initial position after the first and second electrodes 16 and 18 become discharged. The actuator 10 generates motions by closing the gaps between the first and second electrodes 16 and 18. Thus, the actuator 10 is typically named as a gap-closing actuator.

One of the shortcomings of the conventional gap-closing actuator 10 is the difficulty in controlling its fabrication process. In fabrication, the first and second electrodes 16 and 18 are typically formed by performing an etching process on a semiconductor substrate. As shown in FIG. 1, the first and second electrodes 16 and 18 are interposed among each other in an asymmetric manner where a gap D1 between at least one of the first electrodes 16 and one of two consecutive second electrodes 18 between which the first electrode 16 is disposed is wider than a gap D2 between the first electrode 16 and the other of the two consecutive second electrodes 18. Due to different aspect ratios of the gaps D1 and D2, the etch rate of the semiconductor material in the wider gap D1 can be faster than that in the narrower gap D2. Thus, it is difficult to fabricate the wider gap D1 and the narrower gap D2 in the same depth, which in turn makes it difficult to control the size of the actuator 10 accurately.

Moreover, the smaller the line width of the electrodes and the larger the ratio D1 to D2, the more difficult it is to control the etch rate variation in fabrication. Thus, in order to control the etch rate variation in a manageable range, the minimum width of the gap D2 that can be selected for the actuator 10 is limited. This, in turn, leads to greater power consumption of the actuator, because the wider the gap D2, the higher the voltage it is required to operate the actuator 10 for a given return spring constant.

Another shortcoming of the conventional gap-closing actuator 10 is that the asymmetric arrangement of electrodes 16 and 18 prevents the size of the actuator 10 from being reduced beyond limits imposed by lithographical processes. In fabrication, the gaps D1 and D2 among the electrodes 16 and 18 are defined by a photo mask during a lithographic process, which typically has a limit for a minimal line width that can be defined. Although the narrower gap D2 can be defined as being equal to the minimal line width of the lithographic process, the wider gap D1 is certainly broader than the minimal line width because it needs to be longer than the narrower gap D2 in order to ensure that the mover 14 moves in a desired direction when the actuator 10 is in operation.

Accordingly, what is needed is a gap-closing actuator whose fabrication process can be accurately controlled, power consumption can be decreased, and size can be reduced beyond limits imposed by lithographic processes.

SUMMARY

Embodiments of the invention relate to gap-closing actuators. In some embodiments of the invention, the gap-closing actuator can include a stator having one or more first electrodes, a mover having one or more second electrodes interposed among the first electrodes, and a biasing mechanism for applying a non-capacitive bias to the mover for urging the mover to move in a desired direction with respect to the stator. The non-capacitive bias is different from a capacitive force generated between the first and second electrodes when the gap-closing actuator is in operation.

Embodiments of the invention also relate to processes for fabricating a gap-closing actuator. In some embodiments of the invention, a stator having one or more first electrodes can be formed. A mover having one or more second electrodes interposed among the first electrodes can be formed. A non-capacitive bias can be applied to the mover for urging the mover to move in a desired direction with respect to the stator. The non-capacitive bias is different from a capacitive force generated between the first and second electrodes when the gap-closing actuator is in operation.

BRIEF DESCRIPTION OF THE DRAWINGS

Where possible, identical reference numbers are used herein to designate elements that are common to the figures. The images used in the drawings may be simplified for illustrative purposes and are not necessarily depicted to scale.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures can show simplified or partial views, and the dimensions of elements in the figures can be exaggerated or otherwise not in proportion for clarity. In addition, as the terms "on" and "attached to" are used herein, one object (e.g., a material, a layer, a substrate, etc.) can be "on" or "attached to" another object regardless of whether the one object is directly on or attached to the other object or there are one or more intervening objects between the one object and the other object. Also, directions (e.g., above, below, top, bottom, side, up, down, over, under, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Figure 1:
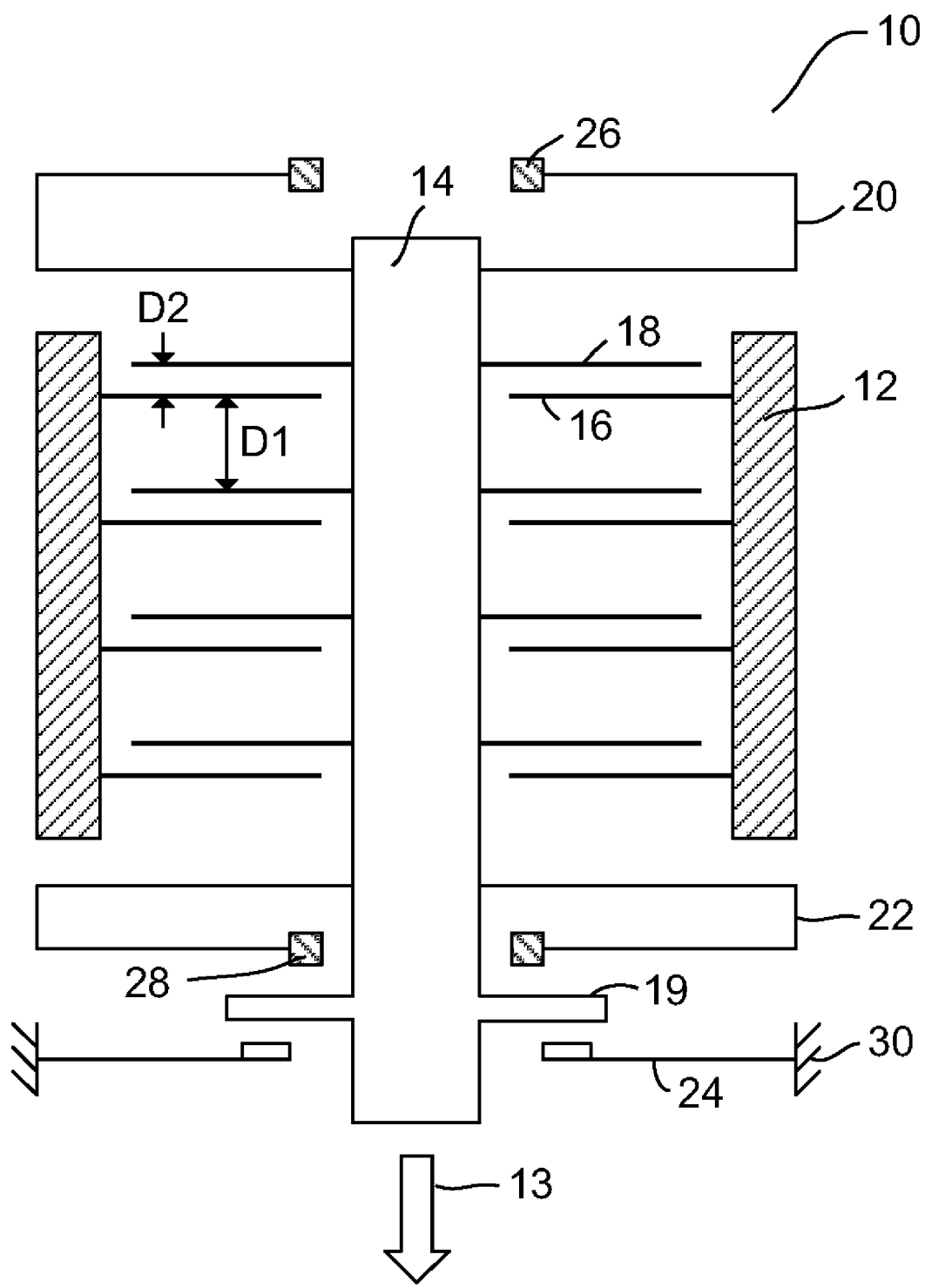
FIG. 1 illustrates a schematic top view of a conventional gap-closing actuator 10.
Figure 2A:
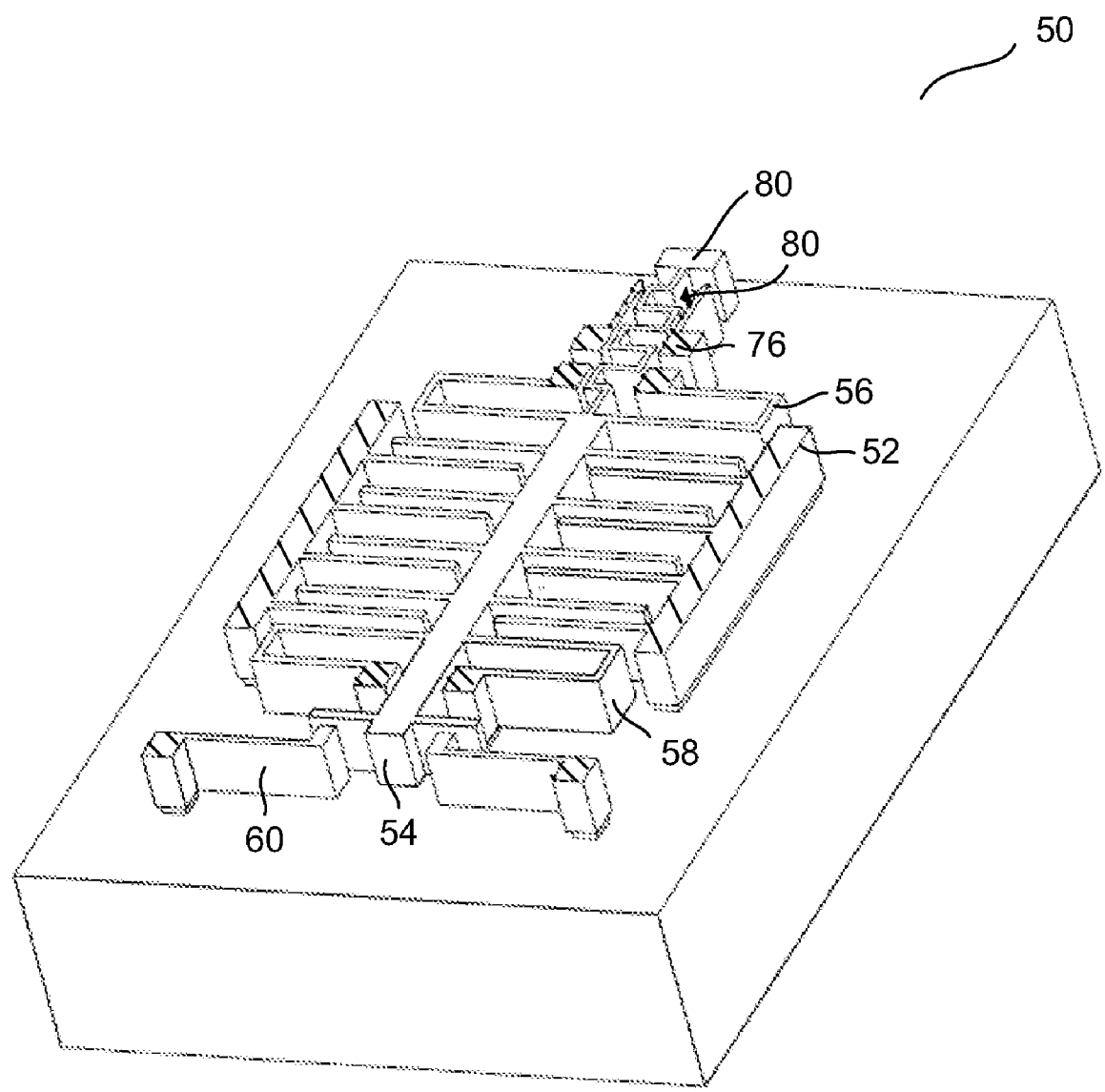
FIG. 2A illustrates a perspective view of a gap-closing actuator in a pre-biasing state in accordance with some embodiments of the invention.
Figure 2B:
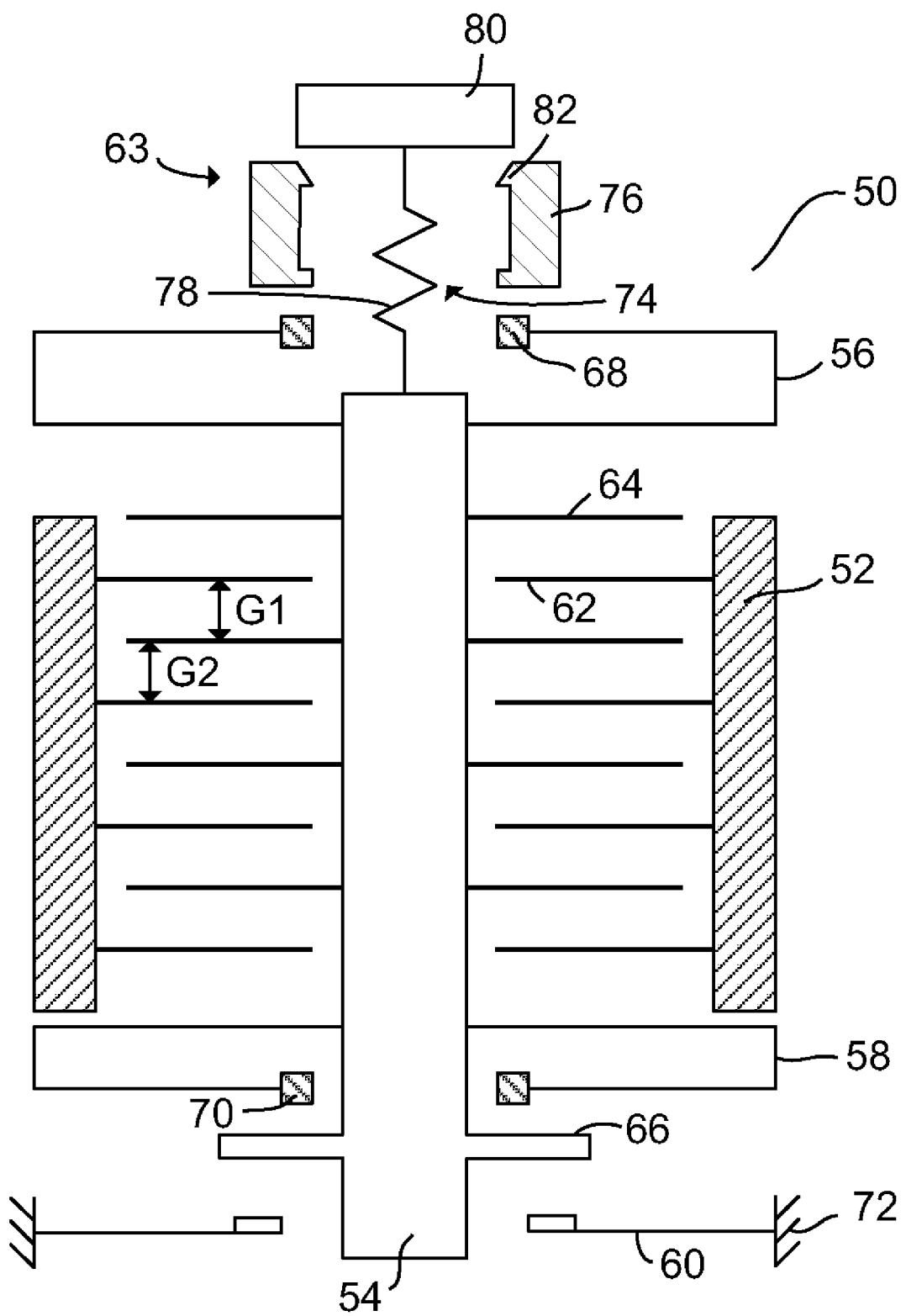
FIG. 2B illustrates a schematic top view of a gap-closing actuator in a pre-biasing state in accordance with some embodiments of the invention.

FIG. 2A illustrates a perspective view of a gap-closing actuator 50 in a pre-biasing state in accordance with some embodiments of the invention, whereas FIG. 2B illustrates an equivalent, schematic top view of the actuator 50. Referring to FIGS. 2A and 2B, the gap-closing actuator 50 can comprise a stator 52, a mover 54 capable of moving relative to the stator 52, a number of return springs 56, 58, and 60, and a biasing mechanism 63. The stator 52 can have one or more first electrodes 62 extending therefrom toward the mover 54. The mover 54 can have one or more second electrodes 64 extending therefrom toward the stator 52. At least one of the first electrodes 62 can be disposed between two consecutive second electrodes 64. In some embodiments of the invention, the at least one of the first electrodes 62 can be disposed substantially at a middle point between the two consecutive second electrodes 64 in a substantially symmetrical manner where a first gap G1 between the first electrode 62 and one of the two consecutive second electrodes 64 and a second gap G2 between the first electrode 62 and the other of the two consecutive second electrodes 64 can be the same or substantially the same. Likewise, at least one of the second electrodes 64 can be disposed substantially at a middle point between two consecutive first electrodes 62 in a substantially symmetrical manner. The mover 54 can have one or more protrusions 66 extending from its body. The return springs 56 and 58 can be coupled between the mover 54 and their respective fixtures 68 and 70. Each of the return springs 60 can have one end coupled to a fixture 72, and another end disposed in proximity of its corresponding protrusion 66.

Note that the numbers of the electrodes, springs, protrusions, and fixtures illustrated in FIG. 2B are merely examples to provide a context in which the concept of the invention can be described. For example, although eight pairs of the first and second electrodes 62 and 64 are illustrated in FIG. 2B, the number thereof can be more or less than eight in some embodiments of the invention. Likewise, although three sets of return springs 56, 58 and 60 are illustrated in the figure, there can be more or less than three sets of return springs, and the number of the protrusions 66 can be adjusted accordingly to accommodate the return springs in some embodiments of the invention. Geometry of the actuator 50 can vary without departing from the sprit of the invention. For example, the first and second electrodes 62 and 64 can be disposed in a substantially asymmetric manner, in which some of the electrodes are closer to each other than others. In other examples, the lengths of the electrodes can be different. As another example, the geometry of the mover 54, the stator 56, the springs 56, 58 and 60, and the protrusions 66 can be in regular, irregular, or other suitable shapes.

The biasing mechanism 63 can comprise at least one loading element 74 and at least one position constraint 76. In some embodiments of the invention, the loading element 74 can comprise a biasing spring 78 coupled between the mover 54 and an engaging member 80 adapted to be engaged with the position constraint 76. The position constraint 76 can have one or more protrusions 82 configured to receive the engaging member 80 in one direction and constrain its movement in another direction once they are engaged. In the pre-biasing state, the engaging element 80 and the position constraint 76 are disengaged. As such, the biasing spring 78 can be in a relaxed state where it does not apply a bias to the mover 54.

Figure 3:
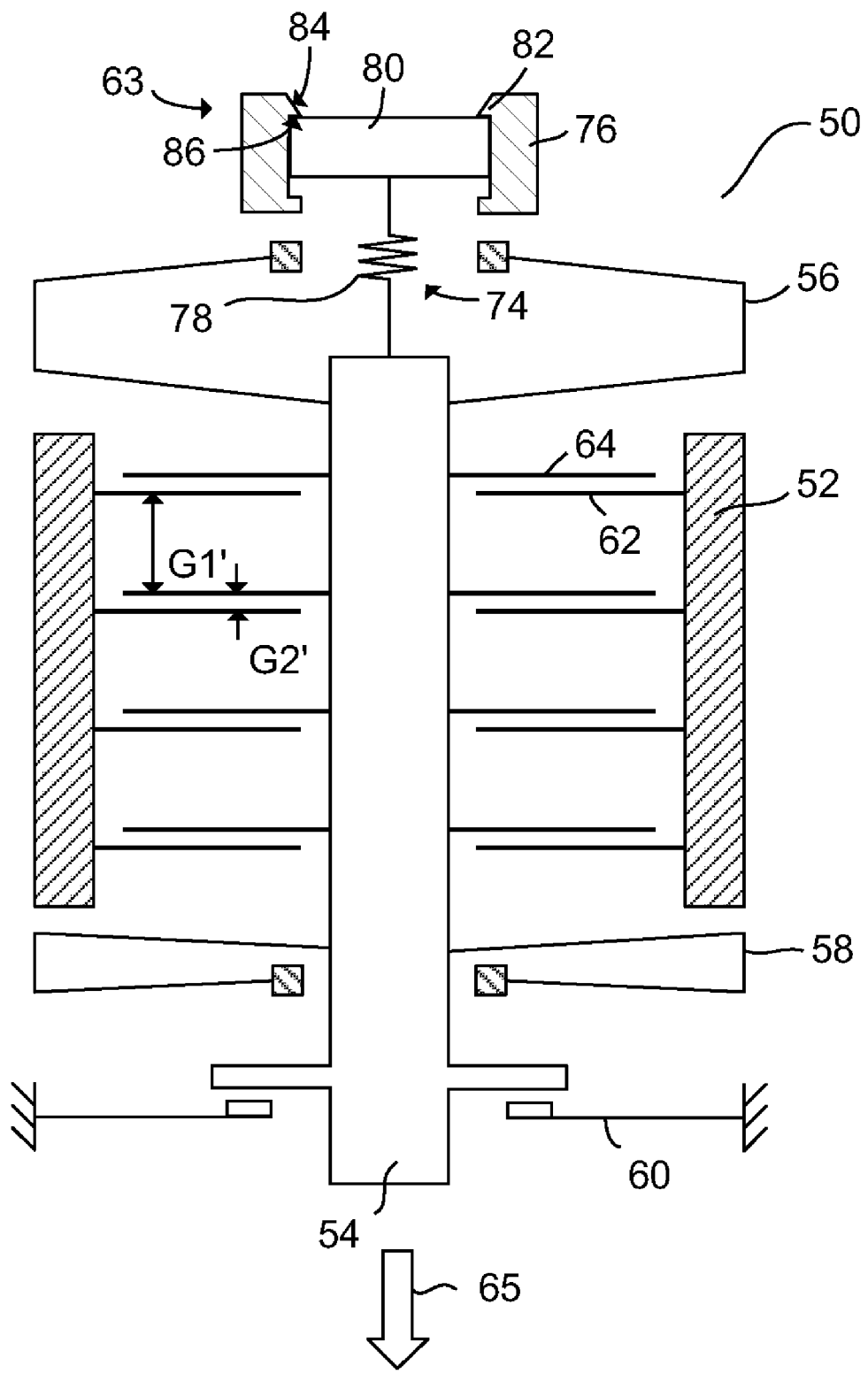
FIG. 3 illustrates a schematic top view of a gap-closing actuator in a biased state in accordance with some embodiments of the invention.

FIG. 3 illustrates a schematic top view of the gap-closing actuator 50 in a biased state in accordance with some embodiments of the invention. In the biased state, the loading element 74 can be engaged with the position constraint 76 by moving the engaging element 80 from one side of the protrusions 82 to another side thereof in a direction toward the mover 54. Each of the protrusions 82 may have an inclined surface 84 on one side, and a flat surface 86 on another side. As the engaging element 80 moves toward the mover 54, it can move along the inclined surfaces 84 of the protrusions 82 and forces the position constraint 76 to expand in a transverse direction, or itself to bend inwardly. Once the engaging element 80 moves beyond the inclined surfaces 84, it can be constrained inside the protrusions 82 by the flat surfaces 86.

Note that the position constraint 76 utilizing the inclined and flat surfaces 84 and 86 to engage and constrain the engaging element 80 is merely an example of many mechanisms that can hold the engaging element 80 in one position in the pre-biasing state, and another in the biased state. For example, the position constraint 76 can be configured to have an opening into which the engaging element 80 can be press fitted. All of the mechanisms that can achieve the above described engaging and constraining purposes are within the scope of the invention.

In the biased state, the biasing mechanism 63 can apply a non-capacitive bias to the mover 54 for urging the mover 54 to move in a desired direction with respect to the stator 52, wherein the non-capacitive bias is different from a capacitive force generated between the first and second electrodes 62 and 64 when the gap-closing actuator 50 is in operation. As shown in FIG. 3, the engaged engaging element 80 can compress the biasing spring 78 of the loading element 74 to apply a non-capacitive bias to the mover 54 in a longitudinal direction, and sustain the bias as the mover 54 moves back and forth in operation. The bias can move at least one of the second electrodes 64 to become closer to one of two consecutive first electrodes 62 between which the at least one of the second electrodes 64 is disposed. As a result, a first gap G1' between the at least one of the first electrodes 62 and one of the two consecutive second electrodes 64 can become wider than a second gap G2' between the first electrode 62 and the other of the two consecutive second electrodes 64. These uneven gaps among the first and second electrodes 62 and 64 can ensure the mover 54 to move in a desired direction relative to the stator 52 in operation.

Note that although the bias can be generated by compressing the biasing spring 78 as described, in some embodiments, it may also be generated by stretching a spring.

In operation, the first and second electrodes 62 and 64 can be electrically charged to create a capacitive force between them. As discussed above, the biasing mechanism 63 can reconfigure the first and second electrodes 62 and 64 to be interposed among each other, for example, in a substantially asymmetric manner. Because given the same amount of charge, the capacitive force between a closer pair of the first and second electrodes 62 and 64 can be larger than that between a pair of the first and second electrodes 62 that are further apart, the mover 54 can be ensured to move in a desired direction relative to the stator 52 as shown by an arrow 65 in the figure. As the mover 54 moves along the direction shown by the arrow 65, the return springs 56, 58, and 60 may deflect to provide it with a return force that can be necessary to push the mover 54 back to its initial position after the first and second electrodes 62 and 64 become discharged.

Note that the biasing mechanism 63 is one of many exemplary mechanisms that can bias the actuator 50 to ensure that the mover 54 moves in a desired direction in operation. Any mechanisms suitable for generating such bias can be used in replacement of the exemplary biasing mechanism 63 without deviating from the spirit of the invention.

In fabrication, the mover 54 and the stator 52 can be formed on a substrate, such as a semiconductor wafer. A lithographical process can be performed to form a masking layer, such as a photoresist layer, and a patterned oxide or nitride layer (not shown in the figures), defining the first and second electrodes 62 and 64 on the substrate. An etching process can be performed to etch away parts of the substrate unprotected by the masking layer. After the first and second electrodes 62 and 64 are formed, the masking layer can be stripped away. In a pre-biasing state, the first and second electrodes can be evenly interposed in a substantially symmetric manner as shown in FIG. 2B. To configure the actuator 50 into a biased state, the mover 54 can be non-capacitively biased to ensure that the mover 54 moves in a desired direction with respect to the stator 58 in operation, as shown in FIG. 3. As discussed above, the non-capacitive bias can be a spring force generated by deforming a biasing spring. The biasing spring can be engaged with a position constraint, thereby maintaining the biasing spring in a deformed shape. There are many ways the biasing spring can be engaged with the position constraint. For example, the biasing spring can be engaged with the position constraint by a non-capacitive force, an electric force, acceleration, electromagnetic resonance, or a combination thereof. In some embodiments of the invention, the non-capacitive force can be a mechanical force applied, for example, by using a pick and place machine to put a spring in place, and then attaching the spring to a substrate by means of, for example, adhesives.

One advantage of the invention is that the fabrication process of the biased gap-closing actuator can be more easily controlled than the prior art. As discussed above, the first and second electrodes 62 and 64 of the gap-closing actuator 50 can be configured in a substantially symmetric manner in a pre-biasing state during the fabrication. As such, the gap G1 between at least one of the first electrodes 62 and one of two consecutive second electrodes 64 between which the at least one of the first electrodes 62 is disposed, and the gap G2 between the at least one of the first electrodes 62 and the other of the two consecutive second electrodes 64 can be equal or substantially equal in length. Because the gaps G1 and G2 can provide the same or substantially the same aspect ratio, the etch rates of the semiconductor material in the gaps G1 and G2, respectively, can be substantially the same. Thus, the depths of the gaps G1 and G2 can be easily and accurately controlled during an etching process.

Another advantage of the biased gap-closing actuator 50 is that its size can be reduced beyond limitations of lithographical and etching processes. For example, as shown in FIG. 2B, the gaps G1 and G2 among the first and second electrodes 62 and 64 can be made equal to a minimal line width a lithographic process allows in the pre-biasing state. In the biased state, the mover 54 can be moved in a predetermined direction, such that the gap G2 can be reduced into the narrower gap G2' as shown in FIG. 3. Because the gap G2 can equal the minimal line width the lithographic process allows, the gap G2' reduced from the gap G2 can be narrower than the minimal line width of the lithographic process. As a result, the biased gap-closing actuator 50 according to some embodiments of the invention can be made smaller than conventional actuators whose sizes are limited by lithographical processes.

Figure 4:
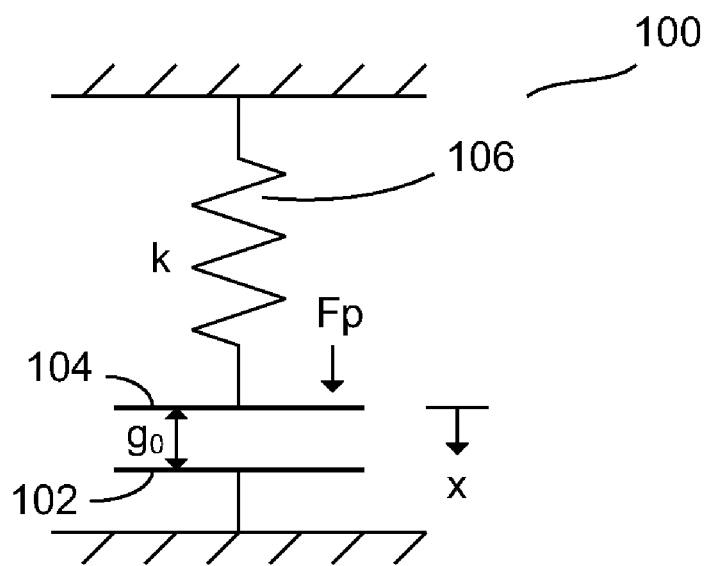
FIG. 4 schematically illustrates a diagram showing an electro-mechanical system of a biased gap-closing actuator in accordance with some embodiments of the invention.

Another advantage of the biased gap-closing actuator 50 according to some embodiments of the invention is that it may consume less power than conventional actuators. FIG. 4 schematically illustrates an electro-mechanical system 100 representing the gap-closing actuator 50 in a biased state. The electro-mechanical system 100 can include a first electrode 102 collectively representing the first electrodes 62 of the stator 52, a second electrode 104 collectively representing the second electrodes 64 of the mover 54, and a spring 106 collectively representing the return springs 56, 58, and 60. The capacitive force $F_{cap}$ between the first and second electrodes 102 and 104 can be expressed mathematically by the following equation:

$$F_{cap} = \frac{\varepsilon A V^2}{2(g_0 - x)^2} \quad (1)$$

Where $\varepsilon$ denotes a capacitive coefficient, A the area between the first and second electrodes 102 and 104, $g_0$ the initial distance between the first and second electrodes 102 and 104, and x the distance traveled by the second electrode 104. The non-capacitive bias can be designated by $F_p$. The return force $F_{sp}$ generated by the spring 104 can be mathematically expressed by the following equation: $F_{sp}=kx$, where k denotes the spring constant of the spring 106. In equilibrium, $$F_{sp}=F_p+F_{cap} \quad (2)$$

The non-capacitive bias $F_p$ can be a spring force, which is a function of x, or a non-spring force, which pushes the mover 54 to a desired position. Whether the non-capacitive bias $F_p$ is a spring force or non-spring force, the summation of the non-capacitive bias $F_p$ and the capacitive force $F_{cap}$ in the initial state needs to exceed the return spring force $F_{sp}$ to ensure that the gap-closing actuator can close properly.

Figure 5:
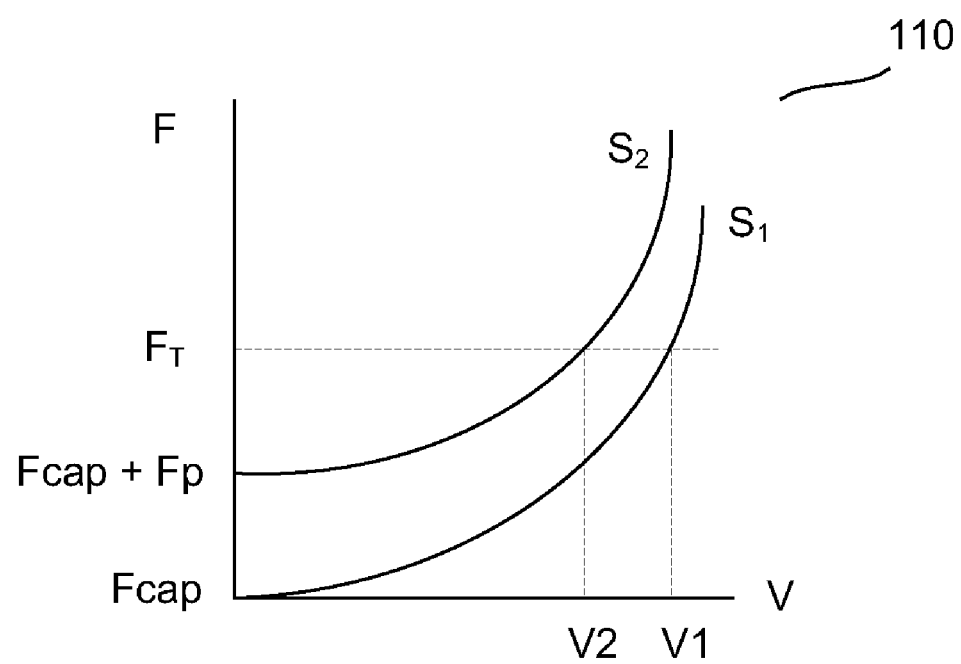
FIG. 5 illustrates a graph showing a reduced voltage supply for a biased gap-closing actuator in accordance with some embodiments of the invention.

Referring to FIG. 5, graph 110 can include a first curve S1 showing a gap-closing force of a conventional gap-closing actuator under various voltages, and a second curve S2 showing a gap-closing force of a biased gap-closing actuator according to some embodiments of the invention under various voltages. The gap-closing force of the conventional gap-closing actuator can equal the capacitive force $F_{cap}$ between the first and second electrodes 102 and 104, whereas the gap-closing force of the biased gap-closing actuator can equal the capacitive force $F_{cap}$ between the first and second electrodes 102 and 104 plus a bias $F_p$. As a result, the second curve S2 can be plotted higher than the first curve S1 in the force-voltage diagram where the x-axis represents the voltage and the y-axis represents the gap-closing force. As shown in the figure, the conventional gap-closing actuator requires voltage V1 to reach a predetermined threshold gap-closing force $F_T$, whereas the biased gap-closing actuator requires voltage V2 to reach the predetermined threshold gap-closing force $F_T$. Due to the bias $F_p$, voltage V2 can be smaller than voltage V1. Thus, the biased gap-closing actuator according to some embodiments of the invention can operate under a smaller voltage, and therefore consume less power, than the conventional gap-closing actuator.

Figure 6:
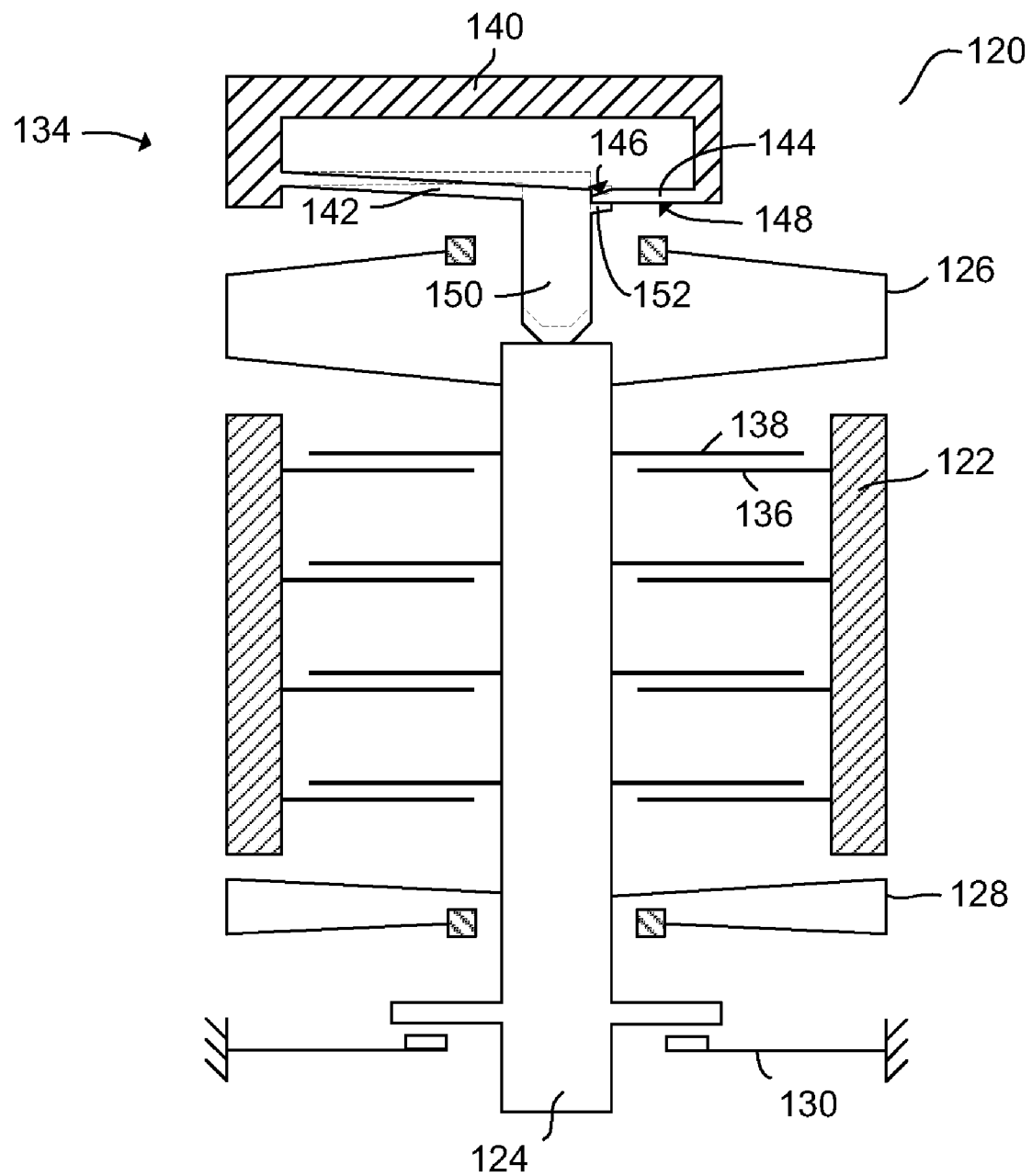
FIG. 6 illustrates a schematic top view of a biased gap-closing actuator in accordance with some embodiments of the invention.

Although the bias generated by the biasing mechanism 63 is a spring force, it can be a non-spring force in some embodiments of the invention. Referring to FIG. 6, a top view of a biased gap-closing actuator 120 is schematically illustrated in accordance with some embodiments of the invention. The biased gap-closing actuator 120 can comprise a stator 122, a mover 124 capable of moving relative to the stator 122, a number of return springs 126, 128, and 130, and a biasing mechanism 134. The stator 122 can have a plurality of first electrodes 136 extending therefrom toward the mover 124. The mover 124 can have a plurality of second electrodes 138 extending therefrom toward the stator 122. The biasing mechanism 134 can comprise a fixture 140 having a protruded portion 144 with an inclined surface 146 on one side and a flat surface 148 on another side. The protruded portion 144 can be flexible or non-flexible. From the fixture 140, a loading element 142 configured in a cantilevered shape can extend toward the protruded portion 144. The loading element 142 can include a head portion 150 in alignment with the mover 124, and an engaging element 152 adapted to engage with the protruded portion 144.

In a pre-biasing state (not shown in the figure), the first and second electrodes 136 and 138 can be interposed among each other in a substantially symmetric manner, such that at least one of the first electrodes 136 can be disposed substantially at a middle point between two consecutive second electrodes 138. The engaging element 152 (as shown by the broken lines) can be disengaged with the protruded portion 144 of the fixture 140, such that the loading element 142 can be in a relaxed state without applying any bias to the mover 124.

In the biased state, the biasing mechanism 134 can apply a non-capacitive bias to the mover 124 for urging the mover 124 to move in a desired direction with respect to the stator 122. In creating the bias, the loading element 142 can be deflected by forcing the head portion 150 toward the mover 124. The loading element 142 can be maintained in a deflected position by engaging the engaging element 152 with the protruded portion 144 of the fixture 140. As a result, the head portion 150 of the loading element 142 can push the mover 124 in a predetermined direction, such that the arrangement of the second electrodes 138 and the first electrodes 136 can become substantially asymmetric, thereby ensuring the mover 124 to move in a desired direction in operation. Since the loading element 142 does not function as a spring in an engaged position, the bias it applies to the mover 124 can be a non-spring force.

Note that the biasing mechanism 134 is one of many exemplary mechanisms that can bias the actuator 120 with a non-spring force to ensure that the mover 124 moves in a desired direction in operation. Any mechanisms suitable for generating such bias can be used in replacement of the exemplary biasing mechanism 134 without deviating from the spirit of the invention. Also note that the biased gap-closing actuator 120 can be fabricated in a similar manner as described above, and the gap-closing actuator 120 can also provide similar advantages as described above.

Figure 7:
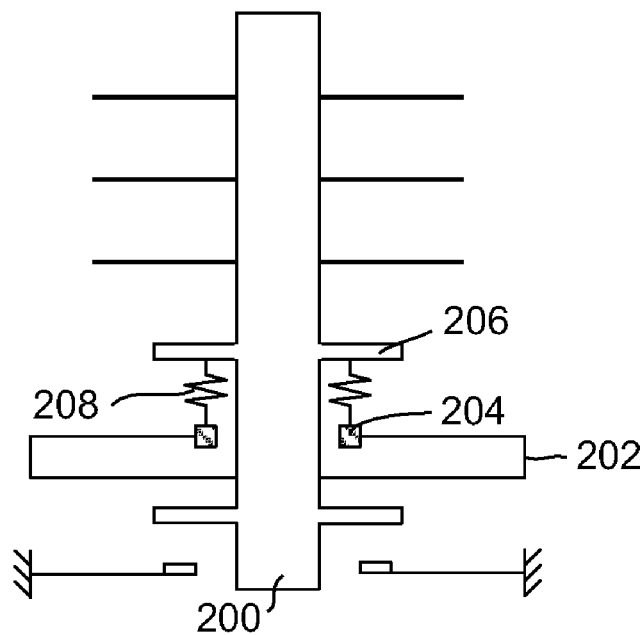
FIG. 7 illustrates a schematic top view of a mover of a gap-closing actuator in a pre-biasing state in accordance with some embodiments of the invention.

FIG. 7 illustrates a schematic top view of a mover 200 of a biased gap-closing actuator where the stator is omitted for purposes of clarity in accordance with some embodiments of the invention. One or more return springs 202 can be coupled between the mover 200 and one or more corresponding fixtures 204. The mover 200 can have one or more protrusion portions 206 extending from the body thereof. One or more loading elements 208 can be coupled between their corresponding protrusion portions 206 and fixtures 204. The loading element 208 can be relaxed in a pre-biasing state.

Figure 8:
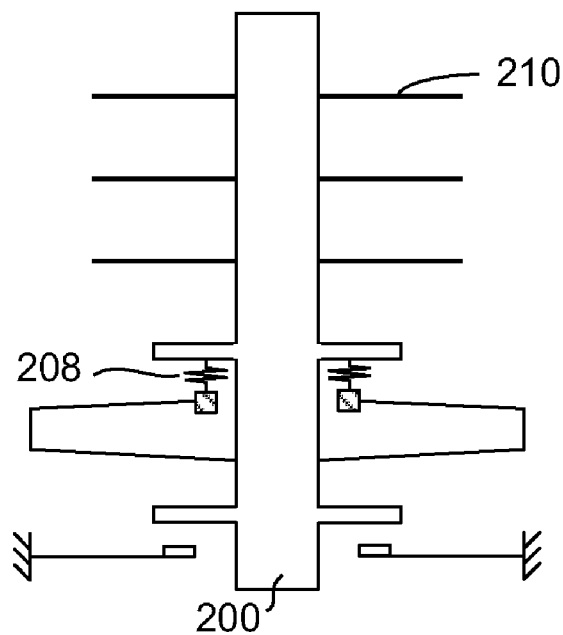
FIG. 8 illustrates a schematic top view of a mover of a gap-closing actuator in a biased state in accordance with some embodiments of the invention.

Referring to FIG. 8, the loading element 208 can be thermally of chemically treated to change its shape permanently or temporarily, such that the mover 208 can be displaced from its original position in the pre-biasing state to a new position in the biased state. Suitable material choices for the loading element 208 can include, for example, electroplated nickel cobalt, palladium cobalt, and a composite structure of nickel cobalt and palladium cobalt. In some embodiments of the invention, a leverage mechanism can be used to amplify the deflection or deformation of the loading element 208 induced by the thermal or chemical treatment. Such displacement can alter an arrangement of the electrodes 210 of the mover 200 with respect to the electrodes of the stator (not shown in the figure). As a result, the mover 200 can be non-capacitively biased to move in a desired direction.

Although specific embodiments and applications of the invention have been described in this specification, there is no intention that the invention be limited these exemplary embodiments and applications or to the manner in which the exemplary embodiments and applications operate or are described herein. For example, particular exemplary test systems have been disclosed, but it will be apparent that the inventive concepts described above can apply equally to alternate arrangements of a test system. Moreover, while specific exemplary processes for testing an electronic device have been disclosed, variations in the order of the processing steps, substitution of alternate processing steps, elimination of some processing steps, or combinations of multiple processing steps that do not depart from the inventive concepts are contemplated. Accordingly, it is not intended that the invention be limited except as by the claims set forth below.

We claim:
1. A gap-closing actuator comprising:
a stator having one or more first electrodes;
a mover having one or more second electrodes interposed among the first electrodes; and
a biasing mechanism for applying a non-capacitive bias to the mover for urging the mover to move in a desired direction with respect to the stator,
wherein the non-capacitive bias is different from a capacitive force generated between the first and second electrodes when the gap-closing actuator is in operation.

2. The gap-closing actuator of claim 1 wherein at least one of the first electrodes is disposed substantially at a middle point between two consecutive second electrodes in a pre-biasing state.

3. The gap-closing actuator of claim 2 wherein the non-capacitive bias moves the at least one of the first electrodes to become closer to one of the two consecutive second electrodes than the other in a biased state.

4. The gap-closing actuator of claim 3 wherein the non-capacitive bias is a spring force.

5. The gap-closing actuator of claim 3 wherein the biasing mechanism comprises a loading element for generating the non-capacitive bias.

6. The gap-closing actuator of claim 5 wherein the biasing mechanism comprises a position constraint for constraining the loading element in a predetermined position in order to sustain the non-capacitive bias.

7. The gap-closing actuator of claim 6 wherein the position constraint and the loading element are disengaged in the pre-biasing state.

8. The gap-closing actuator of claim 6 wherein the position constraint and the loading element are engaged in the biased state.

9. The gap-closing actuator of claim 1 wherein at least one gap between the first and second electrodes is narrower than a minimal line width that can be defined by a lithographic process.

10. A process for fabricating a gap-closing actuator comprising:
    forming a stator having one or more first electrodes;
    forming a mover having one or more second electrodes interposed among the first electrodes; and
    applying a non-capacitive bias to the mover for urging the mover to move in a desired direction with respect to the stator,
    wherein the non-capacitive bias is different from a capacitive force generated between the first and second electrodes when the gap-closing actuator is in operation.

11. The process of claim 10 wherein the non-capacitive bias is a spring force.

12. The process of claim 11 wherein the spring force is generated by providing a spring;
    deforming the spring;
    maintaining the spring in a deformed shape to generate the spring force.

13. The process of claim 12 wherein the maintaining comprises thermally treating the spring.

14. The process of claim 13 wherein the maintaining comprises engaging the spring with a position constraint.

15. The process of claim 14 wherein the spring is engaged with the position constraint by acceleration, an electric force, electromagnetic resonance, or a combination thereof.

* * * * *